(12) United States Patent
Tanahashi et al.

(10) Patent No.: US 10,091,041 B2
(45) Date of Patent: Oct. 2, 2018

(54) WIRELESS COMMUNICATION APPARATUS, INTEGRATED CIRCUIT, TRANSMISSION METHOD, RECEPTION METHOD, AND COMMUNICATION METHOD

(71) Applicant: Kabushiki Kaisha Toshiba, Minato-ku (JP)

(72) Inventors: Makoto Tanahashi, Yokohama (JP); Toshiyuki Nakanishi, Yokohama (JP); Noboru Taga, Kounosu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 39 days.

(21) Appl. No.: 15/440,349

(22) Filed: Feb. 23, 2017

(65) Prior Publication Data
US 2017/0163458 A1 Jun. 8, 2017

Related U.S. Application Data

(63) Continuation of application No. PCT/JP2015/084953, filed on Dec. 14, 2015.

(30) Foreign Application Priority Data

Dec. 18, 2014 (JP) .................................. 2014-256120

(51) Int. Cl.
*H04L 27/26* (2006.01)
*H04L 5/00* (2006.01)

(52) U.S. Cl.
CPC ........ *H04L 27/2621* (2013.01); *H04L 5/0048* (2013.01); *H04L 27/2613* (2013.01); *H04L 5/0007* (2013.01)

(58) Field of Classification Search
CPC ............. H04L 27/2613; H04L 27/2621; H04L 5/0007; H04L 25/03006; H04L 27/2631; H03H 17/0266; H03H 17/0628
See application file for complete search history.

(56) References Cited

U.S. PATENT DOCUMENTS 8,798,219 B2 * 8/2014 Buchwald ............. H03L 7/0814
375/350
2003/0202460 A1 10/2003 Jung et al.
(Continued)

FOREIGN PATENT DOCUMENTS

| JP | 2005-33341 | 2/2005 |
|---|---|---|
| JP | 2005-524278 | 8/2005 |
| WO | WO 2012/176495 A1 | 12/2012 |

OTHER PUBLICATIONS

International Search Report dated Feb. 23, 2016 in PCT/JP2015/084953, filed on Dec. 14, 2015 ( with English Translation).
(Continued)

*Primary Examiner* — Raj Jain
(74) *Attorney, Agent, or Firm* — Oblon, McClelland, Maier & Neustadt, L.L.P.

(57) ABSTRACT

In some embodiments, a wireless communication apparatus may include, but is not limited to, a segment divider, a reference symbol inserter, a phase rotator, an adder, and a peak-to-average power ratio evaluator. The reference symbol inserter inserts at least one reference symbol having a phase into at least one of the subcarrier segments. The phase rotator performs respective phase rotations to the subcarrier segments, based at least in part on a plurality of different combination patterns, each of the different combination patterns identifying a respective phase rotation to the subcarrier segments. The peak-to-average power ratio evaluator calculates, for each of the plurality of different combination patterns, a peak-to-average power ratio of the transmission signals generated. The peak-to-average power ratio evaluator selects, from the transmission signals, a transmission signal having a smallest peak-to-average power ratio among the plurality of peak-to-average power ratios calculated.

7 Claims, 11 Drawing Sheets

(56) References Cited

U.S. PATENT DOCUMENTS

2014/0016452 A1   1/2014   Hasegawa
2014/0169501 A1*  6/2014   Nazarathy .......... H03H 17/0266
                                                         375/316
2017/0163458 A1*  6/2017   Tanahashi ........... H04L 27/2621

OTHER PUBLICATIONS

Hyunju Kim et al. "a Pilot Symbol Pattern Enabling Data Recovery Without Side Information in PTS-Based OFDM Systems"< IEEE Transactions on Broadcasting, vol. 57, No. 2, 2011, 6 pages.

* cited by examiner

WIRELESS COMMUNICATION APPARATUS, INTEGRATED CIRCUIT, TRANSMISSION METHOD, RECEPTION METHOD, AND COMMUNICATION METHOD

CROSS-REFERENCE TO RELATED APPLICATIONS

This application is a continuation application of International Application No. PCT/JP2015/084953, filed Dec. 14, 2015, which claims priority to Japanese Patent Application No. 2014-256120, filed Dec. 18, 2014. The contents of these applications are incorporated herein by reference in their entirety.

FIELD

Embodiments of the present invention relate to a wireless communication apparatus, an integrated circuit, a transmission method, a reception method, and a communication method.

BACKGROUND

In an OFDM (orthogonal frequency division multiplexing) system, the PAPR (peak-to-average power ratio) is high. Because a signal having a high PAPR tends to cause distortion in a power amplifier, numerous methods have been proposed to reduce the PAPR. One of the proposed methods is PTS (partial transmit sequence), which has a feature of being able to reduce the PAPR without causing signal distortion, making it a preferable method for use in actual systems. PTS is a method whereby a plurality of subcarriers in an OFDM system are divided into a number of groups, and phase rotations are performed to the subcarrier signals for each group so as to reduce the PAPR. The groups into which the plurality of subcarriers is divided are called segments.

A receiver must acquire the phase rotations that are performed to the subcarrier signals included in each segment in the transmitter. As a method of the transmitter notifying the receiver of the phase rotations, for example, the transmitter transmits a reference symbol having a known phase in each segment, and the receiver estimates the phase rotation of each segment performed by PTS from the displacement of the phase of the reference symbol.

In the above-described method, because a subcarrier into which a reference symbol is inserted cannot transfer data, the data rate drops. Because a reference symbol is necessary for each segment, the data rate drops in proportion to the number of segments. If there are a large number of subcarriers in the OFDM system, the degree of data rate reduction is very small. However, if the amount of information in the reference symbols is increased in order to achieve robustness in the notification of the phase rotation performed by the PTS, the effect of data rate reduction by the reference symbols might increase.

DETAILED DESCRIPTION

Figure 1:
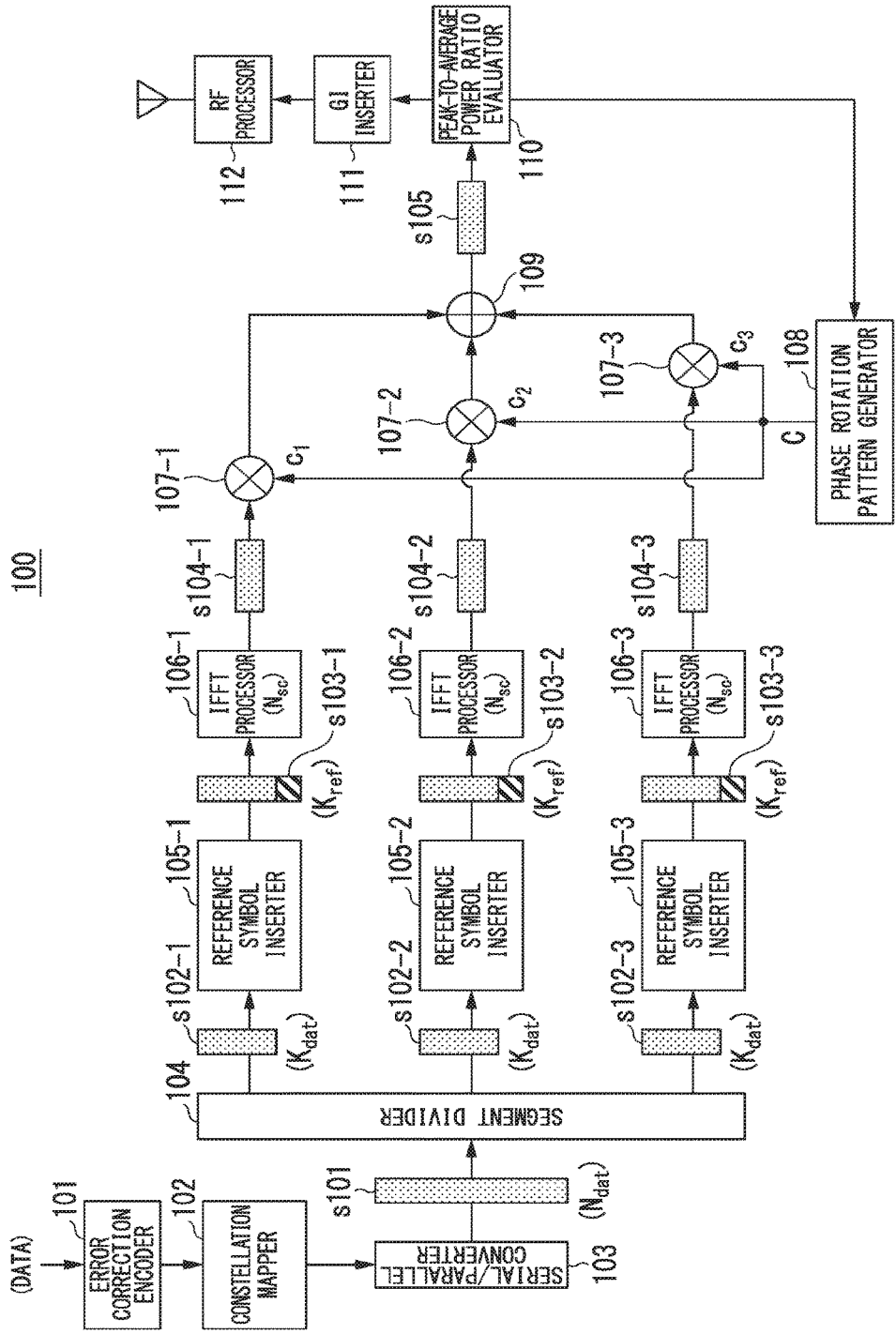
FIG. 1 is a block diagram illustrating the configuration regarding transmission in a wireless communication apparatus in a first embodiment.

In some embodiments, a wireless communication apparatus may include, but is not limited to, a segment divider, a reference symbol inserter, a phase rotator, an adder, and a peak-to-average power ratio evaluator. The segment divider divides a subcarrier group into subcarrier segments. The subcarrier group includes a plurality of subcarriers. The reference symbol inserter inserts at least one reference symbol having a phase into at least one of the subcarrier segments. The phase rotator performs respective phase rotations to the subcarrier segments, based at least in part on a plurality of different combination patterns, each of the different combination patterns identifying a respective phase rotation to the subcarrier segments. The adder adds together signals corresponding to the subcarriers included in the subcarrier segments, to which the respective phase rotations have been performed by the phase rotator, to generate a transmission signal. The peak-to-average power ratio evaluator calculates, for each of the plurality of different combination patterns, a peak-to-average power ratio of the transmission signals generated. The peak-to-average power ratio evaluator selects, from the transmission signals, a transmission signal having a smallest peak-to-average power ratio among the plurality of peak-to-average power ratios calculated.

In some cases, the wireless communication apparatus may further include, but is not limited to, an RF processor. The RF processor transmits the transmission signal selected by the peak-to-average power ratio evaluator.

In other cases, the at least one reference symbol is a plurality of reference symbols. The reference symbol inserter inserts, into at least one of the subcarrier segments, the reference symbols having one or more phases.

In still other cases, the phase rotator performs a zero-degree phase rotation to the subcarrier segment free of any reference symbol.

In further cases, the respective phase rotation is uniquely defined by the at least one reference symbol which is inserted into the subcarrier segment.

In other embodiments, a wireless communication apparatus may include, but is not limited to, a segment divider, a phase rotation pattern detector, and a phase rotation canceller. The segment divider divides a subcarrier group into subcarrier segments. The subcarrier group includes a plurality of subcarriers. The phase rotation pattern detector, based at least in part on a phase of at least one reference symbol included in at least one of the subcarrier segments, identifies an amount of rotation given to the at least one of the subcarrier segments. The phase rotation pattern detector, based at least in part on the amount of rotation identified, detects at least one combination pattern from a plurality of different combination patterns, each of the different combination patterns identifying a respective phase rotation to the subcarrier segments. The phase rotation canceller, based at least in part on the at least one combination pattern detected, cancels a respective phase rotation given to the subcarrier segments.

In still other embodiments, an integrated circuit may include, but is not limited to, a segment divider, a reference symbol inserter, a phase rotator, an adder, and a peak-to-average power ratio evaluator. The segment divider divides a subcarrier group into subcarrier segments. The subcarrier group includes a plurality of subcarriers. The reference symbol inserter inserts at least one reference symbol having a phase into at least one of the subcarrier segments. The phase rotator performs respective phase rotations to the subcarrier segments, based at least in part on a plurality of different combination patterns, each of the different combination patterns identifying a respective phase rotation to the subcarrier segments. The adder adds together signals corresponding to the subcarriers included in the subcarrier segments, to which the respective phase rotations have been performed by the phase rotator, to generate a transmission signal. The peak-to-average power ratio evaluator calculates, for each of the plurality of different combination patterns, a peak-to-average power ratio of the transmission signals generated. The peak-to-average power ratio evaluator selects, from the transmission signals, a transmission signal having a smallest peak-to-average power ratio among the plurality of peak-to-average power ratios calculated.

In further embodiments, a wireless communication apparatus may include, but is not limited to, an antenna, and an integrated circuit. The antenna transmits a transmission signal. The integrated circuit may include, but is not limited to, a segment divider, a reference symbol inserter, a phase rotator, an adder, and a peak-to-average power ratio evaluator. The segment divider divides a subcarrier group into subcarrier segments. The subcarrier group includes a plurality of subcarriers. The reference symbol inserter inserts at least one reference symbol having a phase into at least one of the subcarrier segments. The phase rotator performs respective phase rotations to the subcarrier segments, based at least in part on a plurality of different combination patterns, each of the different combination patterns identifying a respective phase rotation to the subcarrier segments. The adder adds together signals corresponding to the subcarriers included in the subcarrier segments, to which the respective phase rotations have been performed by the phase rotator, to generate a transmission signal. The peak-to-average power ratio evaluator calculates, for each of the plurality of different combination patterns, a peak-to-average power ratio of the transmission signals generated. The peak-to-average power ratio evaluator selects, from the transmission signals, a transmission signal having a smallest peak-to-average power ratio among the plurality of peak-to-average power ratios calculated.

In still further embodiments, an integrated circuit may include, but is not limited to, a segment divider, a phase rotation pattern detector, and a phase rotation canceller. The segment divider divides a subcarrier group into subcarrier segments. The subcarrier group includes a plurality of subcarriers. The phase rotation pattern detector, based at least in part on a phase of at least one reference symbol included in at least one of the subcarrier segments, identifies an amount of rotation given to the at least one of the subcarrier segments. The phase rotation pattern detector, based at least in part on the amount of rotation identified, detects at least one combination pattern from a plurality of different combination patterns, each of the different combination patterns identifying a respective phase rotation to the subcarrier segments. The phase rotation canceller, based at least in part on the at least one combination pattern detected, cancels a respective phase rotation given to the subcarrier segments.

In yet further embodiments, a wireless communication apparatus may include, but is not limited to, an antenna, and an integrated circuit. The antenna receives a received signal. The integrated circuit may include, but is not limited to, a segment divider, a phase rotation pattern detector, and a phase rotation canceller. The segment divider divides a subcarrier group into subcarrier segments. The subcarrier group includes a plurality of subcarriers included in the received signal. The phase rotation pattern detector, based at least in part on a phase of at least one reference symbol included in at least one of the subcarrier segments, identifies an amount of rotation given to the at least one of the subcarrier segments. The phase rotation pattern detector, based at least in part on the amount of rotation identified, detects at least one combination pattern from a plurality of different combination patterns, each of the different combination patterns identifying a respective phase rotation to the subcarrier segments. The phase rotation canceller, based at least in part on the at least one combination pattern detected, cancels a respective phase rotation given to the subcarrier segments.

In furthermore embodiments, a transmission method may include, but is not limited to, the following acts or operations. A subcarrier group is divided into subcarrier segments. The subcarrier group includes a plurality of subcarriers. At least one reference symbol having a phase is inserted into at least one of the subcarrier segments. Respective phase rotations are performed to the subcarrier segments, based at least in part on a plurality of different combination patterns, each of the different combination patterns identifying a respective phase rotation to the subcarrier segments. There is performed adding together signals corresponding to the subcarriers included in the subcarrier segments, to which the respective phase rotations have been performed, to generate a transmission signal. For each of the plurality of different combination patterns, a peak-to-average power ratio of the transmission signals generated is calculated. A transmission signal having a smallest peak-to-average power ratio is selected among the plurality of peak-to-average power ratios calculated, from the transmission signals.

In moreover embodiments, a reception method may include, but is not limited to, the following acts or operations. A subcarrier group is divided into subcarrier segments. The subcarrier group includes a plurality of subcarriers. An amount of rotation given to the at least one of the subcarrier segments is identified based at least in part on a phase of at least one reference symbol included in at least one of the subcarrier segments. There is performed detecting, based at least in part on the amount of rotation identified, at least one combination pattern from a plurality of different combination patterns, each of the different combination patterns identifying a respective phase rotation to the subcarrier segments. A respective phase rotation given to the subcarrier segments is canceled based at least in part on the at least one combination pattern detected.

In additional embodiments, a communication method may include, but is not limited to, the following acts or operations.

A subcarrier group is divided into subcarrier segments. The subcarrier group includes a plurality of subcarriers. At least one reference symbol having a phase is inserted into at least one of the subcarrier segments. Respective phase rotations are performed to the subcarrier segments, based at least in part on a plurality of different combination patterns, each of the different combination patterns identifying a respective phase rotation to the subcarrier segments. There is performed adding together signals corresponding to the subcarriers included in the subcarrier segments, to which the respective phase rotations have been performed, to generate a transmission signal. For each of the plurality of different combination patterns, a peak-to-average power ratio of the transmission signals generated is calculated. A transmission signal having a smallest peak-to-average power ratio is selected among the plurality of peak-to-average power ratios calculated, from the transmission signals. The transmission signal selected is transmitted. The transmission signal selected is received. A subcarrier group is divided into subcarrier segments. The subcarrier group includes a plurality of subcarriers included the transmission signal received. An amount of rotation given to the at least one of the subcarrier segments is identified based at least in part on a phase of at least one reference symbol included in at least one of the subcarrier segments. There is detecting, based at least in part on the amount of rotation identified, at least one combination pattern from a plurality of different combination patterns, each of the different combination patterns identifying a respective phase rotation to the subcarrier segments. A respective phase rotation given to the subcarrier segments is canceled based at least in part on the at least one combination pattern detected.

A wireless communication apparatus, an integrated circuit, a transmission method, a reception method, and a communication method of embodiments will be described below, with references made to the drawings. In the following embodiments, constituent elements that are assigned the same reference symbols operate in the same manner, and duplicated descriptions thereof will be omitted as appropriate.

First Embodiment

FIG. 1 is a block diagram illustrating the configuration regarding transmission in the wireless communication apparatus 100 in the first embodiment. The description to follow is for the case in which the plurality of subcarriers in an OFDM system is divided into three segments. The number of segments may be two or four or greater.

As shown in FIG. 1, the wireless communication apparatus 100 has an error correction encoder 101, a constellation mapper 102, a serial/parallel converter (S/P converter) 103, a segment divider 104, reference symbol inserters 105-1 to 105-3, IFFT processors 106-1 to 106-3, multipliers 107-1 to 107-3, a phase rotation pattern generator 108, an adder 109, a PAPR evaluator 110, a GI inserter 111, and an RF processor 112. In the same drawing, hatched rectangles to which the reference symbols s101, s102-1 to s102-3, s103-1 to s103-3, s104-1 to s104-3, and s105 are applied indicate signals in the wireless communication apparatus 100.

The case in which the data transmitted by the wireless communication apparatus 100 is a random bit stream of 0's and 1's will now be described. The error correction encoder 101 performs error correction encoding of the bit stream to be transmitted and supplies the obtained bit stream to the constellation mapper 102. The constellation mapper 102 maps the bit stream encoded by the error correction encoder 101 onto symbols a complex plane, and supplies the obtained modulation symbols to the serial/parallel converter 103.

The serial/parallel converter 103 converts the modulation symbol stream supplied from the constellation mapper 102 into a modulation symbol stream s101 in which Ndat modulation symbols are made parallel. The serial/parallel converter 103 supplies the modulation symbol stream s101 to the segment divider 104. If the number of subcarriers used for transmission by the wireless communication apparatus 100 is Nsc, Ndat must be less than Nsc (Ndat<Nsc).

The segment divider 104 divides the modulation symbol stream s101 into Nseg segments. Each of the segments s102-1 to s102-3 has Kdat modulation symbols. In the present embodiment, as described above, the number of segments Nseg is 3. The segment divider 104 supplies the three segments s102-1 to s102-3 obtained by the division to the reference symbol inserters 105-1 to 105-3.

The reference symbol inserter 105-1 inserts a reference symbol s103-1 into a predetermined subcarrier in the segment s102-1 supplied from the segment divider 104. The reference symbol inserter 105-1 supplies the segment s102-1 into which was inserted a reference symbol s103-1 to the IFFT processor 106-1. The reference symbol inserters 105-2 and 105-3, similar to the reference symbol inserter 105-1, insert reference symbols 103-2 and s103-2 into the predetermined subcarriers in the segments s102-1 and s102-2, and supply the result to the IFFT processors 106-2 and 106-3.

Each of the reference symbols 103-1 to 103-3 has Kref symbols. Each of the Kref symbols has a predetermined phase that is established beforehand between the transmitting-side device and the receiving-side device. Kref is an integer of 1 or greater. The symbols in the reference symbols s103-1 to s103-3 may have mutually different phases or mutually different amplitudes. The subcarriers to which the reference symbols 103-1 to 103-3 are allocated need not be at the edge of the segments as shown in FIG. 1, but may be any arbitrary subcarriers. Information that indicates the subcarriers to which reference symbols are allocated must be shared between the transmitting side and the receiving side.

Because Kref reference symbols are inserted into each of the segments, the number of reference symbols Nref inserted into all the segments is (Nseg×Kref). In each segment, it is necessary to satisfy the relationship Nsc=Ndat+Nref.

By an inverse FFT, the IFFT processor 106-1 transforms the modulation symbols of the segment s102-1 that includes the reference symbol s103-1 to a time-domain signal s104-1. The IFFT processor 106-1 supplies the time-domain signal s104-1 obtained by the transform to the multiplier 107-1. The IFFT processor 106-2, similar to the IFFT processor 106-1, transforms the modulation symbols of the segment s102-2 that includes the reference symbol s103-2 to a time-domain signal s104-2 and supplies the time-domain signal s104-2 to the multiplier 107-2. The IFFT processor 106-3, similar to the IFFT processor 106-1, transforms the modulation symbols of the segment s102-3 that includes the reference symbol s103-3 to a time-domain signal s104-3 and supplies the time-domain signal s104-3 to the multiplier 107-3. The IFFT processors 106-1 to 106-3 perform an inverse FFT using Nsc points.

The multiplier 107-1 inputs the time-domain signal s104-1 from the IFFT processor 106-1 and inputs a complex scalar value $c_1$ from the phase rotation pattern generator 108. By multiplying the time-domain signal s104-1 by the scalar value $c_1$, the multiplier 107-1 performs a phase rotation to the time-domain signal s104-1. The multiplier 107-1 supplies the multiplication result to the adder 109. The multipliers 107-2 and 107-3 input the time-domain signals s104-2 and s104-3 from the IFFT processors 106-2 and 106-3 and input complex scalar values $c_2$ and $c_3$ from the phase rotation pattern generator 108. The multiplier 107-2 supplies the result of multiplying the time-domain signal 104-2 and the scalar value $c_2$ to the adder 109. The multiplier 107-3 supplies the result of multiplying the time-domain signal 104-3 and the scalar value $c_3$ to the adder 109. The multipliers 107-1, 107-2, and 107-3 each operate as a phase rotator.

The phase rotation pattern generator 108 generates a combination pattern C that is a combination pattern of the scalar values $c_1$ to $c_{Nseg}$ and supplies the scalar values $c_1$ to $c_{Nseg}$ to the multipliers 107-1 to 107-3, respectively. Each of the scalar values included in the combination pattern C $\{=c_1, c_2, \ldots, c_{Nseg}\}$ corresponds to a point from among M points on the unit circle on the complex plane. For example, if M=4, the scalar value is one of [+1, +j, −1, −j], where j is the imaginary unit. The phase of the values that the scalar value can take need not be equally spaced, and may be selected with arbitrary intervals. The number of combination patterns C generated by the phase rotation pattern generator 108 is $M^{(Nseg)}$. From the $M^{(Nseg)}$ combination patterns C, the phase rotation pattern generator 108 generates P combination patterns (where $P \leq M^{(Nseg)}$) either randomly or in accordance with a predetermined rule, and supplies the P combination patterns C to the multipliers 107-1 to 107-3. That is, the multipliers 107-1 to 107-3 perform a multiplication of time-domain signals s104 and the scalar value c P times each time time-domain signals s104-1 to s104-3 are input.

The adder 109 adds the multiplication results each time the multiplication results are supplied by the multipliers 107-1 to 107-3, and supplies the addition result to the PAPR evaluator 110 as the OFDM signal s105. The PAPR evaluator 110 evaluates the PAPR of each of the OFDM signals s105 corresponding to the P combination patterns generated by the phase rotation pattern generator 108. The PAPR evaluator 110 selects an OFDM signal corresponding to the minimum PAPR from among the P PAPRs and supplies the OFDM signal selected to the GI inserter 111. The evaluation performed by the PAPR evaluator 110 is calculation of the PAPR of each of the OFDM signals s105 corresponding to the combination patterns and selection of the OFDM signal s105 corresponding to the minimum PAPR.

The GI inserter 111 inserts a guard interval into the OFDM signal supplied from the PAPR evaluator 110 and supplies the OFDM signal into which the guard interval is inserted to the RF processor 112. The RF processor 112 performs transmission signal processing with respect to the OFDM signal supplied from the GI inserter 111 into which the guard interval is inserted and transmits the OFDM signal from an antenna. The transmission signal processing in the RF processor 112 is, for example, digital/analog conversion, up-conversion to a wireless frequency, and amplification to transmission power.

Figure 2:
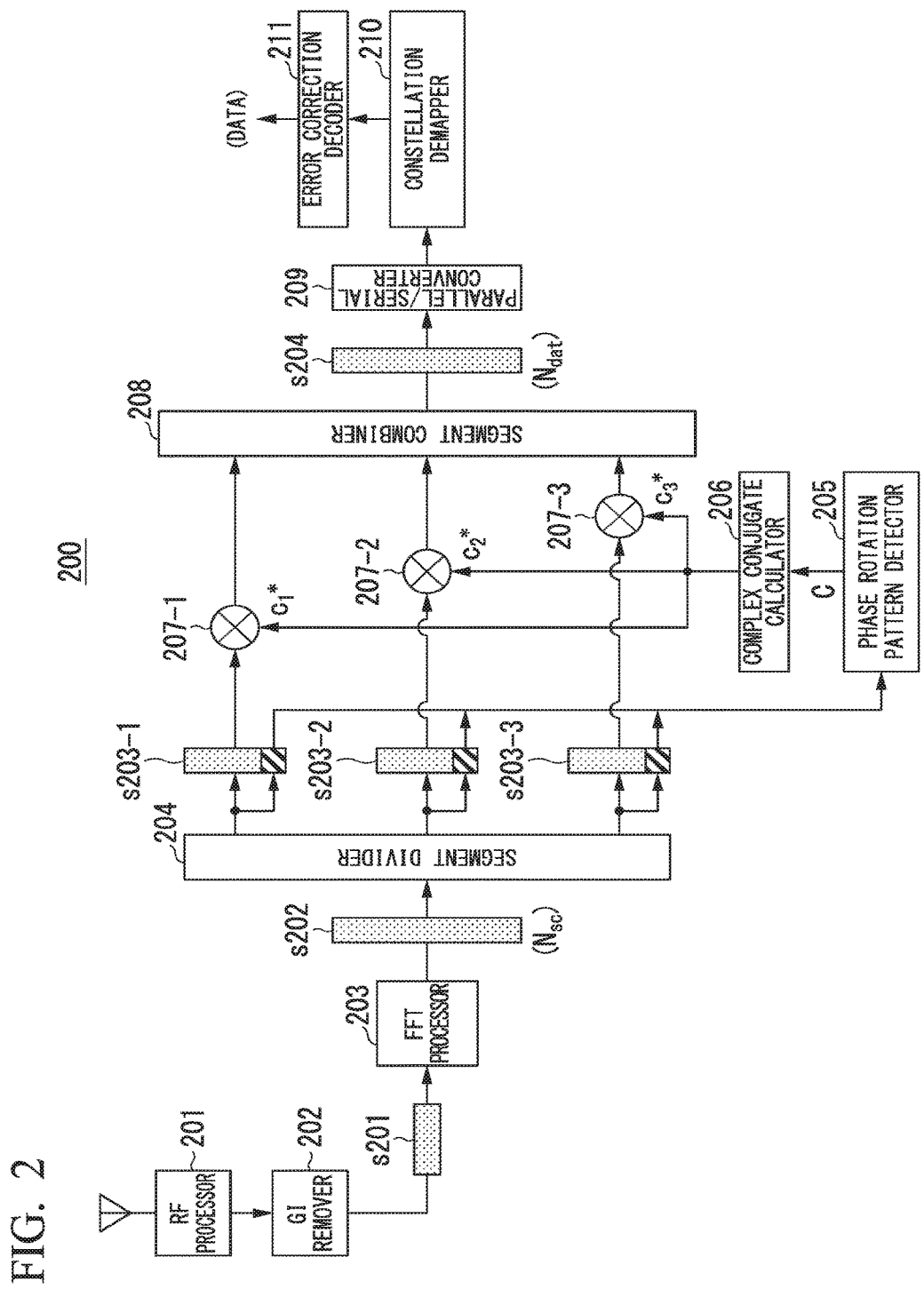
FIG. 2 is a block diagram illustrating the configuration regarding receiving in the wireless communication apparatus.

FIG. 2 is a block diagram illustrating the configuration regarding receiving in the wireless communication apparatus 200 of the first embodiment. As shown in this drawing, the wireless communication apparatus 200 has an RF processor 201, a GI remover 202, an FFT processor 203, a segment divider 204, a phase rotation pattern detector 205, a complex conjugate calculator 206, multipliers 207-1 to 207-3, a segment combiner 208, a parallel/serial converter 209, a constellation demapper 210, and an error correction decoder 211. In the same drawing, the hatched rectangles to which the reference symbols s201, s202, s203-1 to s203-3, and s204 are applied indicate signals in the wireless communication apparatus 200. The wireless communication apparatus 200 receives a signal transmitted from the wireless communication apparatus 100 and acquires data included in the signal.

The RF processor 201 acquires the signal received by an antenna, performs received signal processing with respect to the signal, and supplies a digital baseband signal to the GI remover 202. The received signal processing in the RF processor 201 is, for example, low-noise amplification, filtering that extracts the OFDM frequency band, and down-conversion to the baseband frequency. The GI remover 202 removes the guard interval from the baseband signal supplied from the RF processor 201. The GI remover 202 supplies to the FFT processor 203 the signal s201, which is obtained by removing the guard interval.

By an FFT to transform the signal s201 to a frequency-domain signal, the FFT processor 203 performs expansion to the parallel symbol s202 for each subcarrier. The FFT processor 203 supplies the parallel symbol s202 obtained from the transform to the segment divider 204. The FFT in the FFT processor 203 is performed using Nsc points. The segment divider 204 divides the parallel symbol s202 supplied from the FFT processor 203 into Nseg segments. The reference symbols included in symbols s203-1 to s203-3 of each segment obtained by dividing the parallel symbol s202 are supplied to the phase rotation pattern detector 205. The symbols of the data included in the symbols s203-1 to s203-3 of each segment are supplied to the multipliers 207-1 to 207-3.

The phase rotation pattern detector 205 detects the phase rotation that was performed to each segment from the reference symbols of each segment supplied from the segment divider 204. Because the phases of the reference symbols inserted in the wireless communication apparatus 100 are predetermined, the phase rotation pattern detector 205 can obtain the phase rotations that were performed to each segment by comparing the phases of the reference symbol obtained from the received signal with the determined phase. That is, the phase rotation pattern detector 205 detects the phase rotation combination patterns C. The phase rotation pattern detector 205 supplies the detected combination patterns C to the complex conjugate calculator 206.

The operation by the phase rotation pattern detector 205 will now be described in more detail. Let the reference symbol (complex value) inserted into the n-th segment by the wireless communication apparatus 100 be $r_n$ and the received symbol corresponding to the reference symbol $r_n$ be $R_n$. If it is assumed that there is no noise or interference in the communication path between the wireless communication apparatus 100 and the wireless communication apparatus 200, $R_n = c_n \times r_n$. Therefore, by calculating $c_n = R_n / r_n$ for n=1, 2, . . . , Nseg, it is possible to detect C=$\{c_1, c_2, \ldots, c_{Nseg}\}$.

The complex conjugate calculator 206 calculates the complex conjugate of each scalar value $c_n$ (n=1, 2, . . . Nseg)

included in the combination pattern C detected by the complex conjugate calculator 205 and obtains the complex conjugate $C^*=\{c_1^*, c_2^*, \ldots, c_{Nseg}^*\}$ of the combination pattern C. The complex conjugate calculator 206 supplies the calculated complex conjugate scalar value $(c_1^*, c_2^*, c_3^*)$ to the multipliers 207-1 to 207-3, respectively.

The multiplier 207-1 cancels out the phase rotation that was imparted in the wireless communication apparatus 100 by multiplying the symbols of the data included in the symbols s203-1 and the scalar value $(c_1^*)$ supplied from the complex conjugate calculator 206. The multiplier 207-1 supplies the symbols which have had the phase rotation canceled out, that is, the symbols resulting from the multiplication, to the segment combiner 208. The multiplier 207-2 multiplies the symbols of the data included in the symbols 203-2 by the scalar value $(c_{2*})$ and supplies the result of the multiplication to the segment combiner 208. The multiplier 207-3 multiplies the symbols of the data included in the symbols 203-3 by the scalar value $(c_3^*)$ and supplies the result of the multiplication to the segment combiner 208. The multipliers 207-1 to 207-3 operate as phase rotation cancellers that cancel the phase rotation performed to each segment.

The segment combiner 208 combines the symbols respectively supplied from the multipliers 207-1 to 207-3 to reproduce the parallel symbol s204. The segment combiner 208 supplies the reproduced parallel symbol s204 to the parallel/serial converter 209. The parallel/serial converter 209 converts the parallel symbol s204 into a symbol stream and supplies the obtained symbol stream to the constellation demapper 210. The constellation demapper 210 demodulates the each of the symbols included in the symbol stream supplied from the parallel/serial converter 209 to a bit stream. The constellation demapper 210 supplies the bit stream obtained by demodulation to the error correction decoder 211. The error correction decoder 211 performs error detection and correction of the bit stream and outputs the demodulated bit stream as data.

Figure 3:
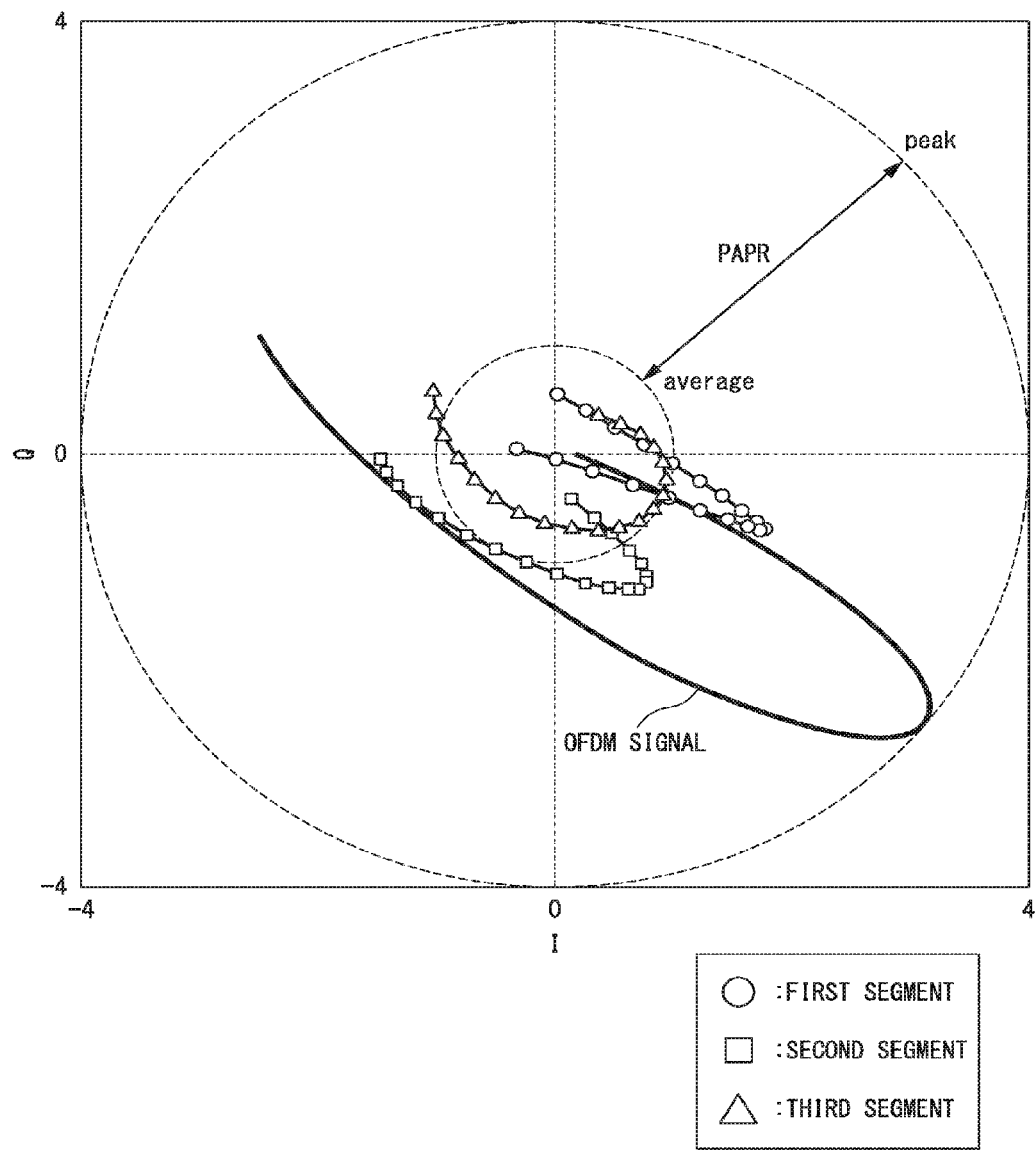
FIG. 3 is a graph illustrating the change with time of a time-domain signal to which PTS is not applied.
Figure 4:
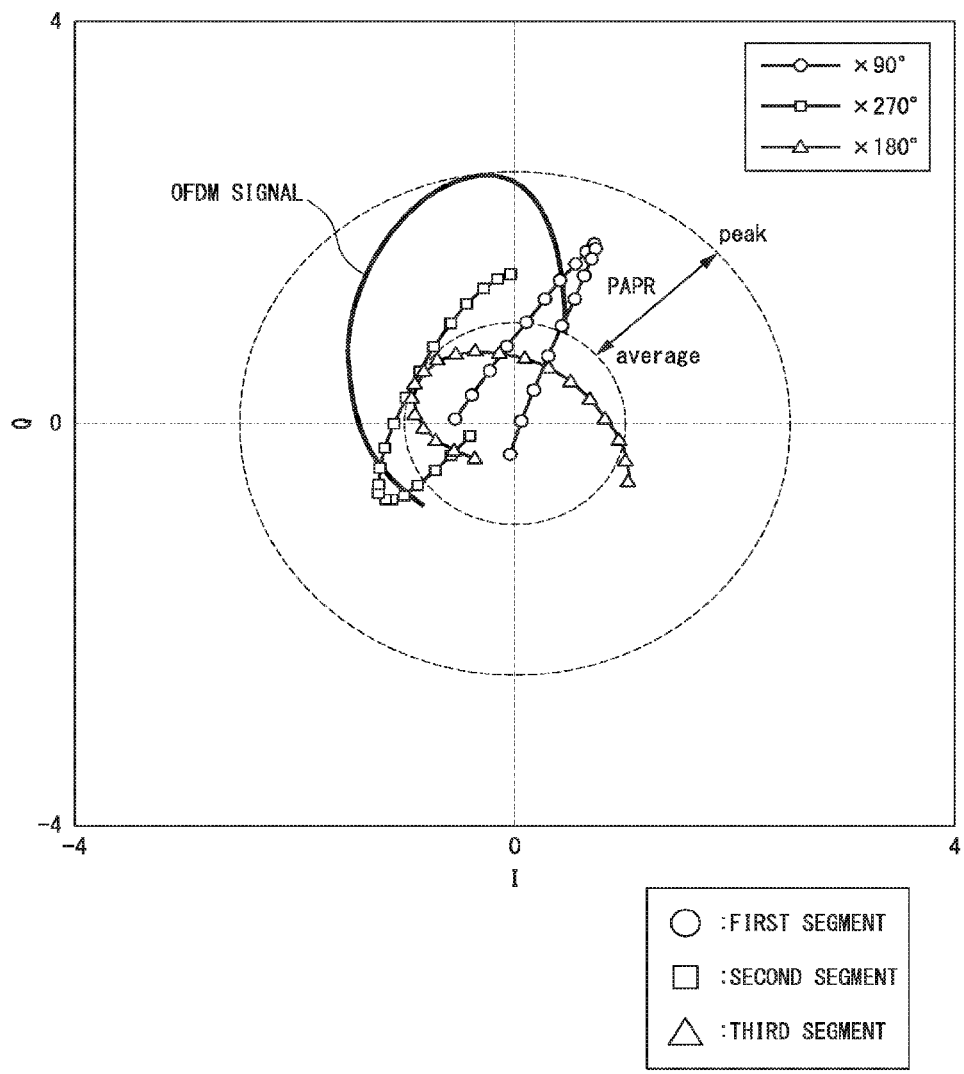
FIG. 4 is a graph illustrating the change with time of a time-domain signal to which PTS has been applied.

The principle of reducing the PAPR by PTS will now be described for case in which the number of segments is 3. FIG. 3 is a graph illustrating the change with time of a time-domain signal to which PTS is not applied. FIG. 4 is a graph illustrating the change with time of a time-domain signal to which PTS has been applied. The time-domain signal corresponds to the time-domain signals s104-1 to s104-3 in FIG. 1. In FIG. 3 and FIG. 4, 20 samples of each time-domain signal of the three segments, the first segment to the third segment, are plotted, with plots at adjacent sampling times connected by lines.

Because a time-domain signal is a complex value, it is represented as a trace by plotting the samples on the complex plane. If PTS is not applied (FIG. 3), the result obtained by simply adding the time-domain signal of the first to the third signals is the OFDM signal. In the example shown in FIG. 3, the traces of the time-domain signals of the first to the third segments are have the same phase, and the peak of the OFDM signal after adding is increased. The ratio between the average value and the peak value of the OFDM signal, that is, the PAPR, also increases.

In contrast, in the case in which PTS was applied (FIG. 4), the result of performing a phase rotation to and adding the time-domain signals of the first to the third segments is the OFDM signal. In the example shown in FIG. 4, phase rotations of 90 degrees, 270 degrees, and 180 degrees are imparted to the time-domain signals of the first to the third segments, respectively. As a result, the traces of the time-domain signal are reversed, and the peak and PAPR of the OFDM, which is the waveform after addition, are reduced. With PTS, combination patterns C with various phase rotations are generated and the PAPR is evaluated when each of the combination patterns C is applied. As a result of the evaluation, the OFDM signal having the minimum PAPR is actually transmitted.

According to a wireless communication system having the wireless communication apparatus 100 and the wireless communication apparatus 200 in the first embodiment, by the wireless communication apparatus 100 inserting reference symbols including Kref predetermined symbols into each segment, the wireless communication apparatus 200 can detect the combination pattern of phase rotations from the received signal with good accuracy. For example, if an error occurs in detection in the wireless communication apparatus 200 when one symbol is inserted into each segment as a reference symbol, there is a possibility that the correct data cannot be obtained. In the present embodiment, by using a plurality of (Kref) reference symbols that include predetermined symbols as described above, robust notification can be made of the phase rotation, even if there was noise or interference in the communication path or an error in detection.

Second Embodiment

In a communication system in the second embodiment, a configuration differs from the wireless communication system of the first embodiment in that reference symbols are not inserted into all segments. Reference symbols are not inserted into some of the segments. The phase rotation to segments into which reference symbols are not inserted is uniquely established based on a phase rotation combination in other segments into which the reference symbol is inserted. A feature of the configuration in the wireless communication system of the second embodiment is that the phase rotation to a segment into which any reference symbol is not inserted is uniquely identified based on the phase rotation combination in other segments into which the reference symbol is inserted.

As an example, a case in which all the subcarriers are divided into three segments (Nseg=3) and a reference symbol is not inserted into the third segment will be described. If the phase rotation to be performed to the first segment and the second segment are the four types of [+1, +j, −1, −j], there are 16 ($=4^2$) combination patterns of the phase rotation to the first segment and the second segment. The phase rotation to be performed to the third segment is uniquely defined as one of [+1, +j, −1, −j] for the 16 combination patterns. Since the phase rotation of each of the 16 combination patterns to the third segment has been defined, the receiving-side device can uniquely identify the phase rotation to the third segments by detecting the phase rotations to the first and second segments.

Specific phase rotation combination patterns C are shown by the example below. In the case of the following phase rotation combination patterns being defined as $C=\{c_1, c_2, c_3\}$, the transmitting-side device selects one of the following phase rotation combination patterns so as to reduce the PAPR.
C={+1, +1, +1}, {+1, +j, +1},
  {+1, −1, +j}, {+1, −j, +1},
  {+j, +1, +j}, {+j, +j, +1},
  {+j, −1, +j}, {+j, −j, −1},
  {−1, +1, −1}, {−1, +j, −j},
  {−1, −1, +j}, {−1, −j, +1},
  {−j, +1, +j}, {−j, +j, +j},
  {−j, −1, +j}, {−j, −j, −1}

Figure 5:
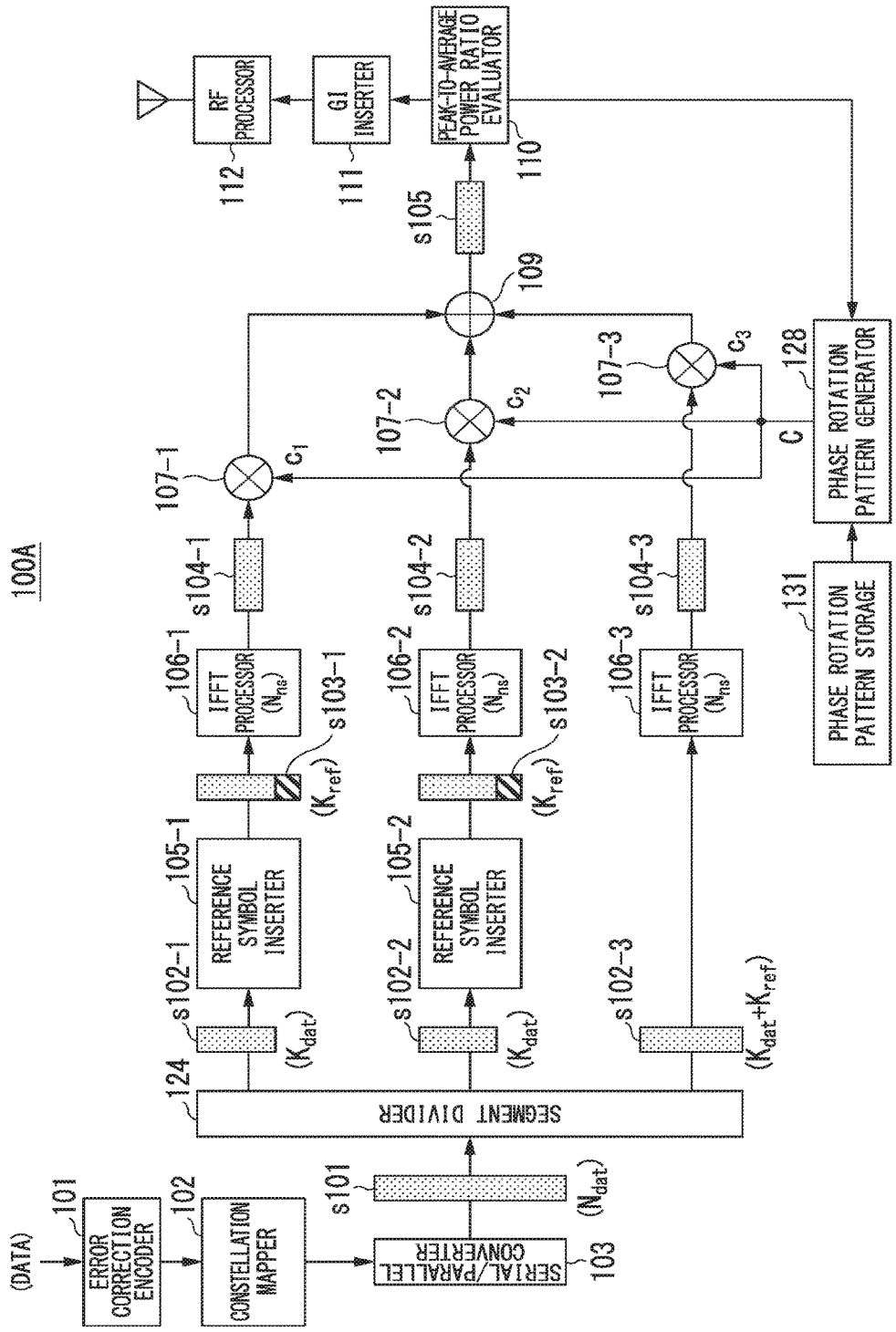
FIG. 5 is a block diagram illustrating the configuration regarding transmission in a wireless communication apparatus in a second embodiment.

FIG. 5 is a block diagram illustrating the configuration regarding transmission in the wireless communication apparatus 100A in the second embodiment. The wireless communication apparatus 100A has a configuration for the case of Nseg=3. The wireless communication apparatus 100A has a configuration in which a reference symbol is not inserted into the third segment. As shown in the same drawing, the wireless communication apparatus 100A has an error correction encoder 101, a constellation mapper 102, a serial/parallel converter (S/P converter) 103, a segment divider 124, reference symbol inserters 105-1 to 105-2, IFFT processors 106-1 to 106-3, multipliers 107-1 to 107-3, a phase rotation pattern storage 131, a phase rotation pattern generator 128, an adder 109, a PAPR evaluator 110, a GI inserter 111, and an RF processor 112. In the same drawing, hatched rectangles to which the reference symbols s101, s102-1 to s102-3, s103-1 to s103-2, s104-1 to s104-3, and s105 are applied indicate signals in the wireless communication apparatus 100A.

The wireless communication apparatus 100A differs from the wireless communication apparatus 100 (FIG. 1) of the first embodiment in not having the reference symbol inserter 105-3, having the segment divider 124 in place of the segment divider 104, having the phase rotation pattern generator 128 in place of the phase rotation pattern generator 108, and having the phase rotation pattern storage 131. In the wireless communication apparatus 100A, elements that are the same as in the wireless communication apparatus 100 are assigned the same reference symbols, and the descriptions thereof will be omitted.

The segment divider 124 divides the modulation symbol stream s101 into Kseg segments. The segments s102-1 and s102-2 have Kdat modulation symbols. The segment s102-3 has (Kdat+Kref) modulation symbols. Because the reference symbol is not inserted into the segment s102-3 as the third segment, a data modulation symbol can be commensurately allocated to the subcarrier in its place.

The segment divider 124 supplies the segments 102-1 and the segment 102-2 obtained by the division to the reference symbol inserters 105-1 and 105-2. The segment divider 124 supplies the segment s102-3 obtained by the division to the IFFT processor 106-3. By an inverse FFT, the IFFT processor 106-3 transforms the modulation symbols of the segment s102-3 supplied from the segment divider 124 to a time-domain signal s104-3.

The phase rotation combination patterns C are stored in the phase rotation pattern storage 131 beforehand. If Nseg=3 and also M=4, in the case in which a reference symbol is not inserted into one segment, the phase rotation pattern storage 131 stores 16 types of phase rotation combination patterns. There may be fewer than 16 phase rotation combination patterns stored in the phase rotation pattern storage 131.

The phase rotation pattern generator 128 reads out the phase rotation combination patterns $C=\{c_1, c_2, \ldots, c_{Nseg}\}$ stored in the phase rotation pattern storage 131. The phase rotation pattern generator 128 supplies each of the scalar values included in the read-out phase rotation combination patterns C to the multipliers 107-1 to 107-3. The phase rotation pattern generator 128 may supply all of the phase rotation combination patterns stored in the phase rotation pattern storage 131 to the multipliers 107-1 to 107-3, or may supply a prescribed number of randomly selected phase rotation combination patterns to the multiplier 107-1 to 107-3.

By not inserting a reference symbol into the third segment, the wireless communication apparatus 100A can increase the data modulation symbols allocated to the subcarrier of the third segment.

Figure 6:
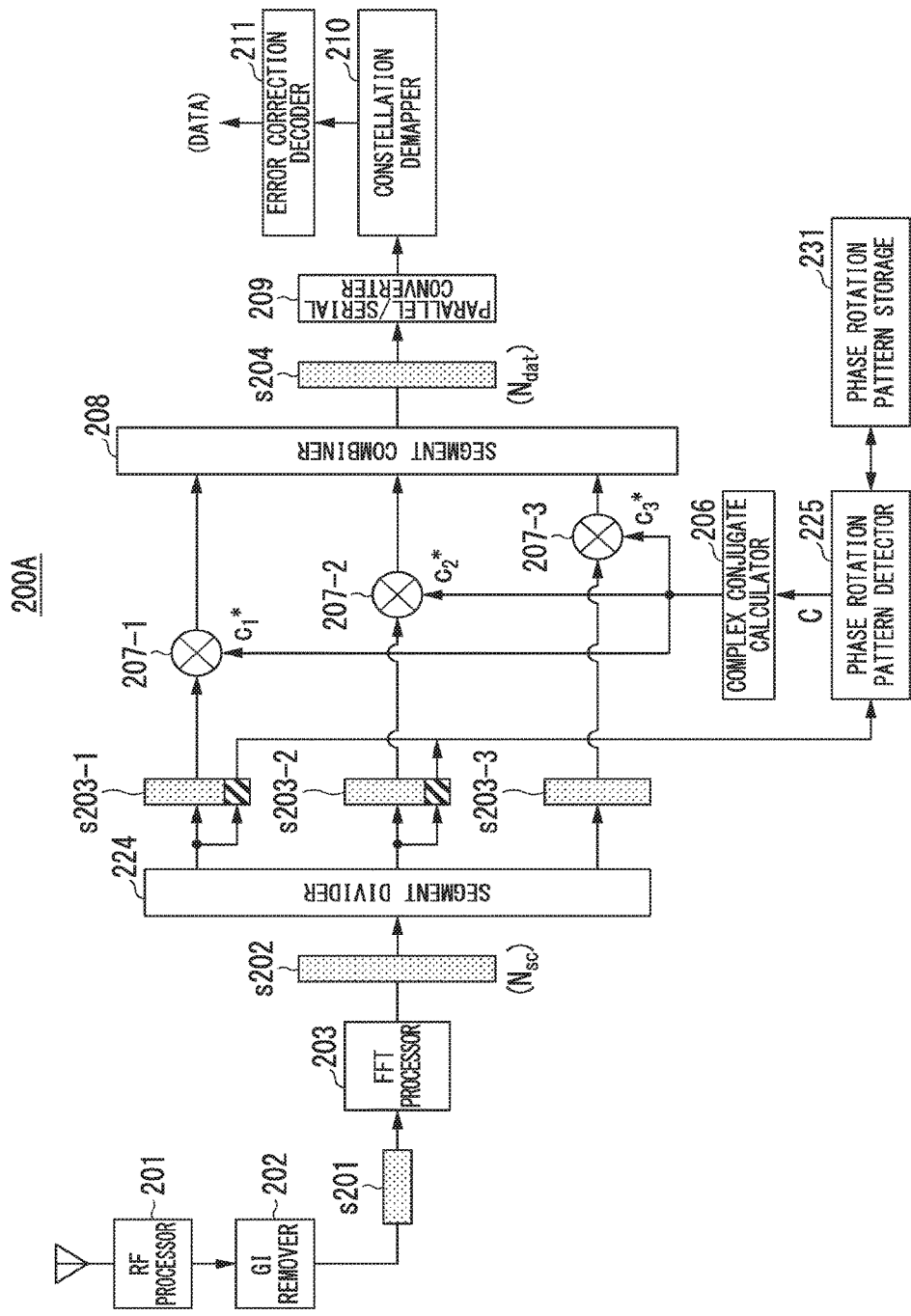
FIG. 6 is a block diagram illustrating the configuration regarding receiving in the wireless communication apparatus.

FIG. 6 is a block diagram illustrating the configuration regarding receiving in the wireless communication apparatus 200A in the second embodiment. As shown in the same drawing, the wireless communication apparatus 200A has an RF processor 201, a GI remover 202, an FFT processor 203, a segment divider 224, a phase rotation pattern storage 231, a phase rotation pattern detector 225, a complex conjugate calculator 206, multipliers 207-1 to 207-2, a segment combiner 208, a parallel/serial converter 209, a constellation demapper 210, and an error correction decoder 211. In the same drawing, hatched rectangles to which the reference symbols s201, s202, s203-1 to s203-3, and s204 are applied indicate signals in the wireless communication apparatus 200B.

The wireless communication apparatus 200A differs from the wireless communication apparatus 200 (FIG. 2) of the first embodiment by having the segment divider 224 in place of the segment divider 204, having the phase rotation pattern detector 225 in place of the phase rotation pattern detector 205, and having the phase rotation pattern storage 231. In the wireless communication apparatus 200A, elements that are the same as in the wireless communication apparatus 200 are assigned the same reference symbols, and the descriptions thereof will be omitted.

The segment divider 224 divides the parallel symbol s202 supplied from the FFT processor 203 into Nseg segments. The symbols s203-1 to s203-3 of the segments are obtained by the division of the parallel symbol s202. Because the symbol s203-3 does not include a reference symbol, all of the symbols s203-3 are supplied to the multiplier 207-3. The reference symbols included in the symbols s203-1 and s203-2 are supplied to the phase rotation pattern detector 225. The data symbols included in the symbols s203-1 and s203-2 are supplied to the multipliers 207-1 to 207-2.

The phase rotation combination patterns C are stored into the phase rotation pattern storage 231 beforehand. The phase rotation combination patterns C stored in the phase rotation pattern storage 231 are the same as the phase rotation combination patterns C stored in the phase rotation pattern storage 131 of the wireless communication apparatus 100A.

The phase rotation pattern detector 225, based on the reference symbols in each segment supplied from the segment divider 224 and the phase rotation combination patterns stored in the phase rotation pattern storage 231, detects the phase rotations that were performed to each segment. By comparing the phase of the reference symbols obtained from the received signal with a predetermined phase, the phase rotation pattern detector 225 obtains the phase rotations that were performed to each segment.

The phase rotation pattern detector 225 detects one phase rotation combination pattern that includes the obtained phase rotations from the phase rotation combination patterns stored in the phase rotation pattern storage 231. By detecting one phase rotation combination pattern from the phase rotation combination patterns stored in the phase rotation pattern storage 231, the phase rotation pattern detector 225 can uniquely identify the phase rotation that was performed to the segment into which the reference symbol is not inserted. The phase rotation pattern detector 225 supplies the detected phase rotation combination pattern C to the complex conjugate calculator 206. The phase rotation pattern detector 225, by the same operation as the phase rotation pattern detector 205, detects the phase rotation from the reference symbol of each segment into which the reference symbol is inserted.

According to a wireless communication system having the wireless communication apparatus 100A and the wireless communication apparatus 200A in the second embodiment, by the wireless communication apparatus 100A inserting reference symbols including Kref predetermined symbols into the segments, the wireless communication apparatus 200A can detect the combination pattern of phase rotations from the received signal with good accuracy. By providing a segment into which the wireless communication apparatus 100A does not insert the reference symbol, the bandwidth occupied by the reference symbols can be reduced and the reduction of the data rate by the reference symbols that notify of the phase rotation in PTS can be suppressed.

Third Embodiment

The wireless communication system in the third embodiment is a variation example of the wireless communication system in the second embodiment. In the second embodiment, the number of segments into which a reference symbol is not inserted is one. In the third embodiment, the description is for the case of having two segments into which reference symbols are not inserted. The phase rotations in the two segments into which reference symbols are not inserted, similar to the second embodiment, are uniquely identified based on the phase rotation performed to one segment into which the reference symbol is inserted.

As an example, a case in which all the subcarriers are divided into three segments (Nseg=3) and reference symbols are not inserted into the second and third segments will be described. If the phase rotation to be performed to the first segment are the four types of [+1, +j, −1, −j], the phase rotation combination patterns $C=\{c_1, c_2, c_3\}$ are defined as follows.
C={+1, −1, +1}, {+j, +j, +1},
 {−j, −j, +j}, {−1, −j, +j}

Figure 7:
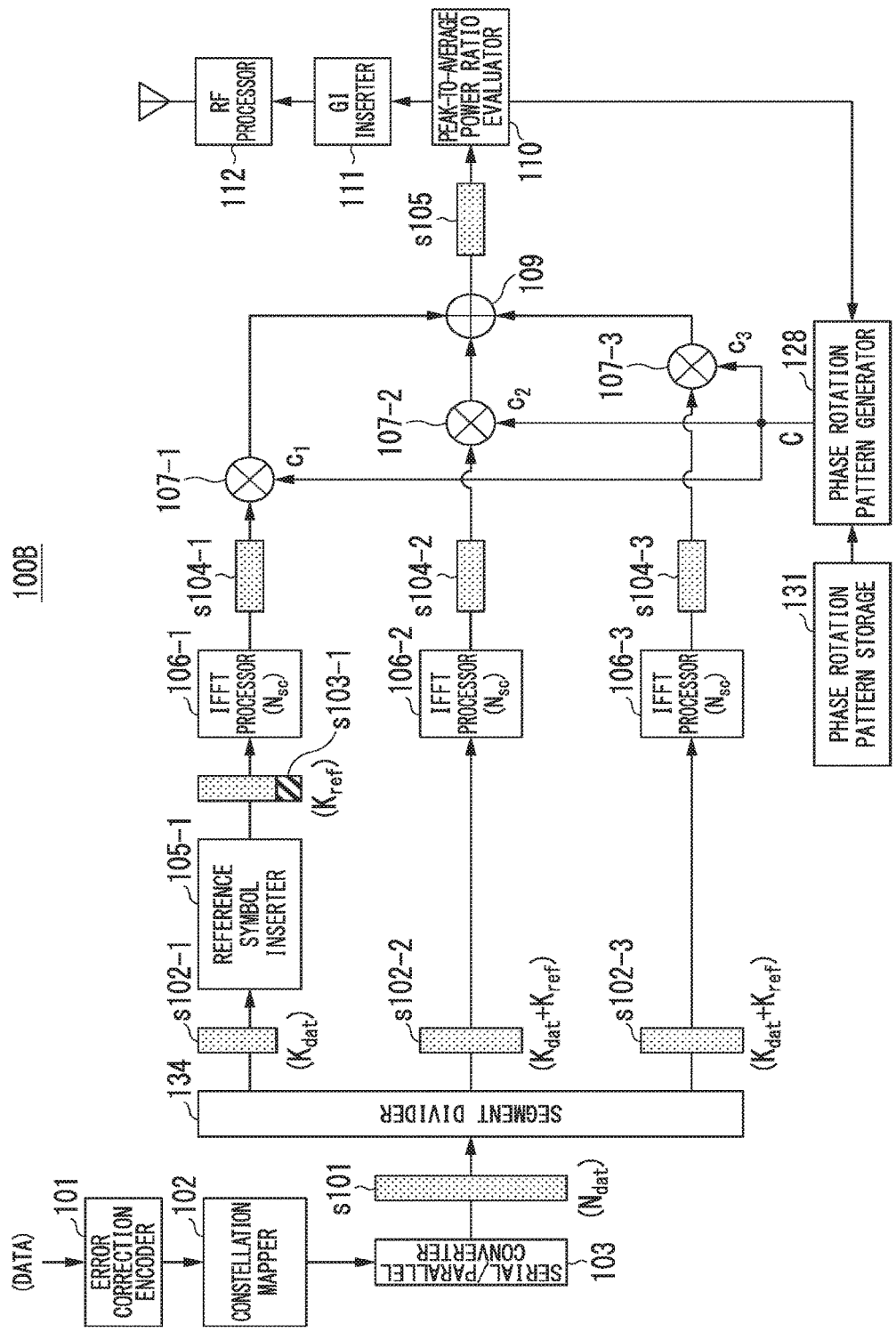
FIG. 7 is a block diagram illustrating the configuration regarding transmission in a wireless communication apparatus in a third embodiment.

FIG. 7 is a block diagram illustrating the configuration regarding transmission in the wireless communication apparatus 100B in the third embodiment. The wireless communication apparatus 100B shown in the same drawing, similar to the second embodiment, has a configuration with Nseg=3. The wireless communication apparatus 100B has a configuration in which reference symbols are not inserted into the second and third segments. As shown in same drawing, the wireless communication apparatus 100B has an error correction encoder 101, a constellation mapper 102, a serial/parallel converter (S/P converter) 103, a segment divider 134, a reference symbol inserter 105-1, IFFT processors 106-1 to 106-3, multipliers 107-1 to 107-3, a phase rotation pattern storage 131, a phase rotation pattern generator 128, an adder 109, a PAPR evaluator 110, a GI inserter 111, and an RF processor 112. In the same drawing, hatched rectangles to which the reference symbols s101, s102-1 to s102-3, s103-1, s104-1 to s104-3, and s105 are applied indicate signals in the wireless communication apparatus 100B.

The wireless communication apparatus 100B differs from the wireless communication apparatus 100A (FIG. 5) of the second embodiment by having the segment divider 134 in place of the segment divider 124, and in not having the reference symbol inserter 105-2. In the wireless communication apparatus 100B, elements that are the same as in the wireless communication apparatus 100A are assigned the same reference symbols, and the descriptions thereof will be omitted.

In the third embodiment, there are four phase rotation combination patterns stored in the phase rotation pattern storage 131.

The segment divider 134 divides the modulation symbol stream s101 into Nseg segments. The segment s102-1 has Kdat modulation symbols. Each of the segments S102-2 and s102-3 has (Kdat+Kref) modulation symbols. Because the segments s102-2 and s102-3, as the second and third segments, do not have reference symbols inserted therein, data modulation symbols can be commensurately allocated to the subcarriers.

The segment divider 134 supplies the segment 102-1 obtained by the division to the reference symbol inserter 105-1. The segment divider 134 supplies the segments s102-2 and s102-3 obtained by the division to the IFFT processors 106-2 and 106-3. By an inverse FFT, the IFFT processor 106-2 transforms the modulation symbols of the segment s102-2 supplied from the segment divider 134 to a time-domain signal s104-2. By an inverse FFT, the IFFT processor 106-3 transforms the modulation symbols of the segment 102-3 supplied from the segment divider 134 to a time-domain signal s104-3.

Figure 8:
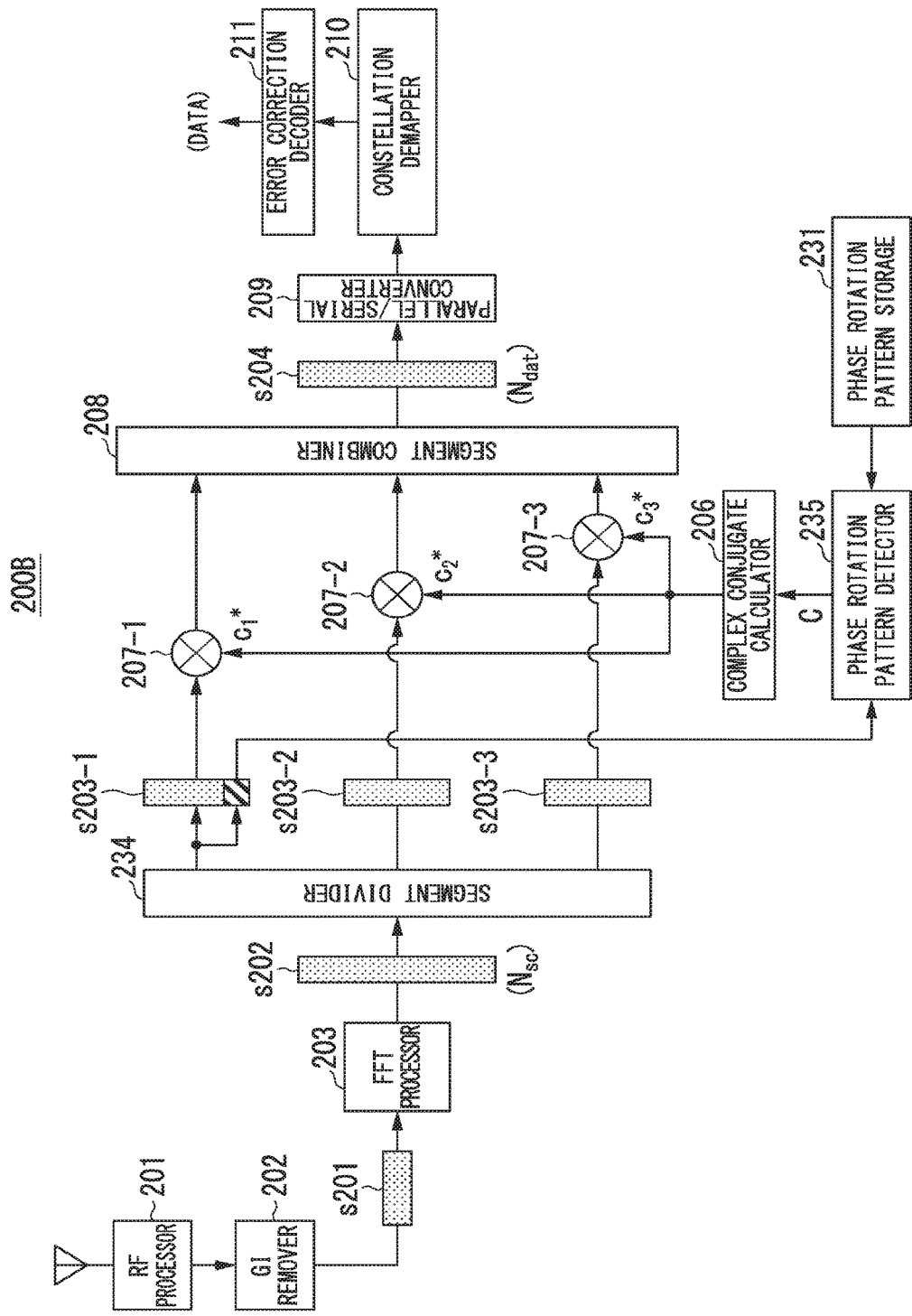
FIG. 8 is a block diagram illustrating the configuration regarding receiving in the wireless communication apparatus.

FIG. 8 is a block diagram illustrating the configuration regarding receiving in the wireless communication apparatus 200B. As shown in the same drawing, the wireless communication apparatus 200B has an RF processor 201, a GI remover 202, an FFT processor 203, a segment divider 234, a phase rotation pattern storage 231, a phase rotation pattern detector 235, a complex conjugate calculator 206, multipliers 207-1 to 207-3, a segment combiner 208, a parallel/serial converter 209, a constellation demapper 210, and an error correction decoder 211. In the same drawing, hatched rectangles to which the reference symbols s201, s202, s203-1 to s203-3, and s204 indicate signals in the wireless communication apparatus 200B.

The wireless communication apparatus 200B differs from the wireless communication apparatus 200A (FIG. 6) of the second embodiment by having the segment divider 234 in place of the segment divider 224 and having the phase rotation pattern detector 235 in place of the phase rotation pattern detector 225. In the wireless communication apparatus 200B, elements that are the same as in the wireless communication apparatus 200A are assigned the same reference symbols, and the descriptions thereof will be omitted. In the third embodiment, there are four phase rotation combination patterns stored in the phase rotation pattern storage 231.

The segment divider 234 divides the parallel symbol s202 supplied from the FFT processor 203 into Nseg segments. The symbols s203-1 to s203-3 of the segments are obtained by the division of the parallel symbol s202. Because the symbols s203-2 and s203-3 do not include reference symbols, the symbols s203-2 and s203-3 are supplied to the multipliers 207-2 and 207-3, respectively. The reference symbol included in the symbol s203-1 is supplied to the phase rotation pattern detector 235. The data symbols included in the symbol s203-1 are supplied to the multiplier 207-1.

The phase rotation pattern detector 235, based on the reference symbol of the segment supplied from the segment divider 234 and the phase rotation combination patterns stored in the phase rotation pattern storage 231, detects the phase rotations that were performed to each segment. By comparing the phase of the reference symbols obtained from the received signal with a predetermined phase, the phase rotation pattern detector 235 obtains the phase rotations that were performed to each segment.

The phase rotation pattern detector 235 detects one phase rotation combination pattern that includes the obtained phase rotations from the phase rotation combination patterns stored in the phase rotation pattern storage 231. By detecting one phase rotation combination pattern from the phase rotation combination patterns stored in the phase rotation pattern storage 231, the phase rotation pattern detector 235 can uniquely identify the phase rotations that were performed to two segments into which the reference symbol is not inserted. The phase rotation pattern detector 235 supplies the detected phase rotation combination pattern C to the complex conjugate calculator 206. The phase rotation pattern detector 235, by the same operation as the phase rotation pattern detector 205, detects the phase rotation from the reference symbol of the segment into which the reference symbol is inserted.

According to a wireless communication system having the wireless communication apparatus 100B and the wireless communication apparatus 200B of the third embodiment, by the wireless communication apparatus 100B inserting reference symbol including Kref predetermined symbols into the first segment, the wireless communication apparatus 200B can detect the phase rotation combination pattern from the received signal with good accuracy. By providing segments into which the reference symbol is not inserted, the bandwidth occupied by the reference symbols can be reduced, and the reduction of the data rate by the reference symbols that notify of the phase rotation in PTS can be suppressed.

Fourth Embodiment

Figure 9:
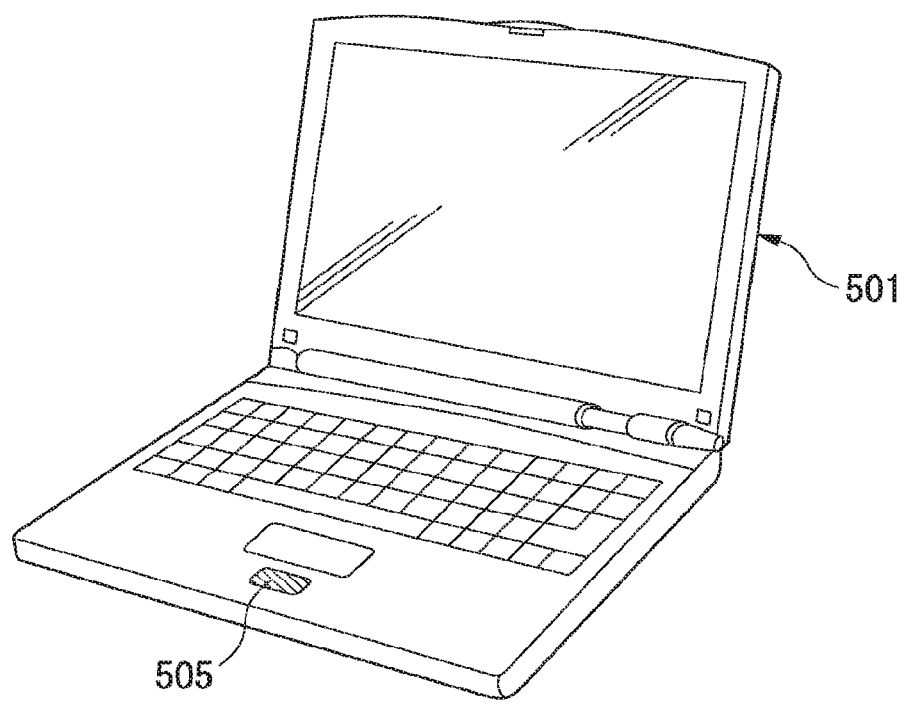
FIG. 9 is a first outer view of a wireless communication apparatus in a fourth embodiment.
Figure 10:
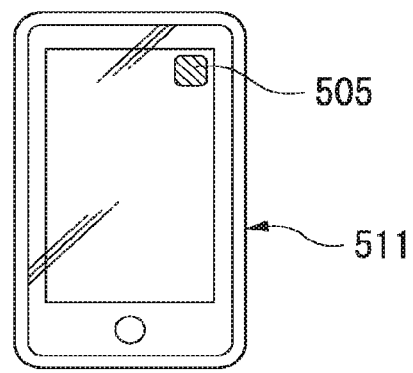
FIG. 10 is a second outer view of the wireless communication apparatus.
Figure 11:
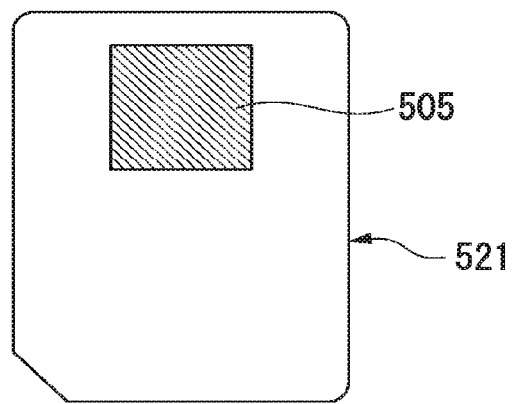
FIG. 11 is a third outer view of the wireless communication apparatus.

FIG. 9, FIG. 10, and FIG. 11 are outer views of wireless communication apparatuses in the fourth embodiment. The wireless communication apparatus shown in FIG. 9 is a laptop computer 501, which has a communication module 505. The communication module 505 is configured to include the elements of one of the wireless communication apparatuses of the first to third embodiments. The communication module 505, for example, is an integrated circuit, which is configured to include the RF processor 201, the GI remover 202, the FFT processor 203, the segment divider 224, the phase rotation pattern storage 231, the phase rotation pattern detector 225, the complex conjugate calculator 206, the multipliers 207-1 to 207-2, the segment combiner 208, the parallel/serial converter 209, the constellation demapper 210, and the error correction decoder 211 of the wireless communication apparatus 200A (FIG. 6).

The communication module 505 is configured to include an analog IC, into which the RF processor 201 is implemented, and an integrated circuit for baseband signal processing, which has the GI remover 202, the FFT processor 203, the segment divider 224, the phase rotation pattern storage 231, the phase rotation pattern detector 225, the complex conjugate calculator 206, the multipliers 207-1 to 207-2, the segment combiner 208, the parallel/serial converter 209, the constellation demapper 210, and the error correction decoder 211. Elements may be implemented in the communication module 505, wherein the elements are included of any one of the wireless communication apparatus 100 or wireless communication apparatus 200 in the first embodiment, the wireless communication apparatus 100A in the second embodiment, and the wireless communication apparatus 100B or the wireless communication apparatus 200B of the third embodiment.

The wireless communication apparatus shown in FIG. 10 is a mobile terminal 511, which has the communication module 505. The wireless communication apparatus having the communication module 505 is not restricted to the laptop computer 501 and the mobile terminal 511 shown in FIG. 9 and FIG. 10. For example, the wireless communication apparatus may be a smartphone, a tablet-type terminal, a television receiver, a digital camera, a wearable device, a game machine, or a vehicle-borne device such as a navigation device. The wireless communication apparatus may be either a portable type that is easily carried around or a desktop type. As shown in FIG. 11, a memory card 521 having the communication module 505 may be the wireless communication apparatus. A device into which the memory card 521 is inserted can use data acquired by the communication module 505 of the memory card 521 and transmit data via the communication module 505.

Fifth Embodiment

Figure 12:
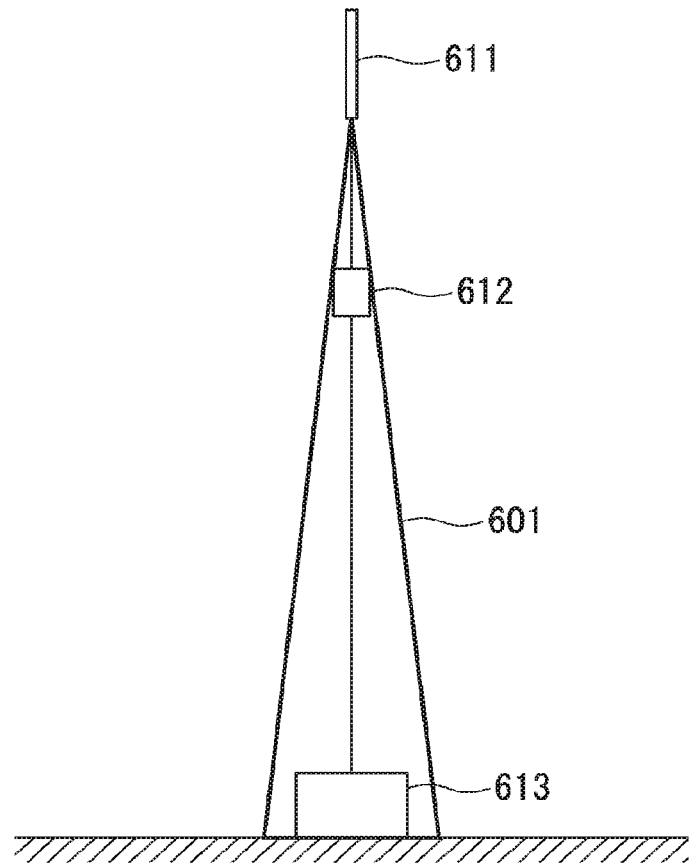
FIG. 12 is a drawing generally illustrating a wireless communication apparatus in a fifth embodiment.

FIG. 12 generally shows a wireless communication apparatus in the fifth embodiment. The wireless communication apparatus shown in FIG. 12 has an antenna apparatus 611, an RF apparatus 612, and a baseband apparatus 613, and is installed on a structure 601. The antenna apparatus 611 has one or more antennas connected to, for example, the wireless communication apparatus 100A shown in FIG. 5 in the second embodiment. The RF apparatus 612 has the RF processor 112 provided in the wireless communication apparatus 100A. The baseband apparatus 613 has the error correction encoder 101, the constellation mapper 102, the serial/parallel converter 103, the segment divider 124, the reference symbol inserters 105-1 to 105-2, the IFFT processors 106-1 to 106-3, the multipliers 107-1 to 107-3, the phase rotation pattern storage 131, the phase rotation pattern generator 128, the adder 109, the PAPR evaluator 110, and the GI inserter 111 provided in the wireless communication apparatus 100A. That is, the wireless communication apparatus in the fifth embodiment is configured by three apparatuses, the antenna apparatus 611, the RF apparatus 612, and the baseband apparatus 613, and performs the same processing as the wireless communication apparatus 100A. The wireless communication apparatus in the fifth embodiment may perform processing that is the same as any one of the wireless communication apparatus 100 or the wireless communication apparatus 200 in the first embodiment, the wireless communication apparatus 200A in the second embodiment, and the wireless communication apparatus 100B or the wireless communication apparatus 200B in the third embodiment.

As shown in FIG. 12, the antenna apparatus 611 is arranged at a high location on the structure 601. The structure 601 may be one that has a wall or roof, or may have a steel frame construction but not have a wall and a roof. The RF apparatus 612 is installed on the structure 601 at a location close to the antenna apparatus 611, and supplies an OFDM signal that is transmitted from the antenna of the antenna apparatus 611. The baseband apparatus 613 is installed at some location on the structure 601 and supplies an OFDM signal to the RF apparatus 612.

The baseband apparatus 613 may be configured to include one or more FPGAs. In this case, by reading out a configuration stored in a non-volatile storage medium included in the baseband apparatus 613, the one or more FPGAs execute the operations of the error correction encoder 101, the constellation mapper 102, the serial/parallel converter 103, the segment divider 124, the reference symbol inserters 105-1 to 105-2, the IFFT processors 106-1 to 106-3, the multipliers 107-1 to 107-3, the phase rotation pattern storage 131, the phase rotation pattern generator 128, the adder 109, the PAPR evaluator 110, and the GI inserter 111. If the wireless communication apparatus in the fifth embodiment performs the same processing as the wireless communication apparatus 200, the one or more FPGAs, by reading out the configuration, execute the operations of the GI remover 202, the FFT processor 203, the segment divider 204, the phase rotation pattern detector 205, the complex conjugate calculator 206, the multipliers 107-1 to 207-3, the segment combiner 208, the parallel/serial converter 209, the constellation demapper 210, and the error correction decoder 211.

The baseband apparatus 613 may further have an interface that accepts data to be transmitted. The baseband apparatus 613 may further have a power supply. The baseband apparatus 613 may further have a data updater that updates the FPGA configuration stored in a non-volatile storage medium.

Sixth Embodiment

The wireless communication apparatus in the sixth embodiment, in addition to the elements of any one of the wireless communication apparatuses of the above-described embodiments, has a bus, a processor, a storage, and an external interface. The processor and the external interface are connected to the various elements via the bus. By executing firmware stored in the storage, the processor controls the various elements. In this manner, by updating the firmware that is stored in the storage included the wireless communication apparatus, the functions of the wireless communication apparatus can be easily changed.

Seventh Embodiment

The wireless communication apparatus in the seventh embodiment, in addition to the elements of any one of the wireless communication apparatuses of the above-described embodiments, has a clock generator. The clock generator generates a clock signal and outputs the clock signal for outside the wireless communication apparatus via an output terminal. In this manner, the clock signal generated in the wireless communication apparatus causes the host side to operate by the clock signal output to the outside, enabling synchronized operation between the host side and the wireless communication apparatus side.

Eighth Embodiment

The wireless communication apparatus in the eighth embodiment, in addition to the elements of any one of the wireless communication apparatuses of the above-described embodiments, has a power supply, a power supply controller, and a wireless power supplier. The power supply controller is connected to the power supply and the wireless power supplier and controls the selection of the power supplied to the wireless communication apparatus. In this manner, adopting a configuration in which a power supply is included in the wireless communication apparatus enables operation with reduced power consumption in which the power supply is controlled.

Ninth Embodiment

The wireless communication apparatus in the ninth embodiment, in addition to the elements of any one of the wireless communication apparatuses of the above-described embodiments, has a SIM card and a controller. The controller, for example, performs authentication using the identification information stored in the SIM card and performs control so that transmission or receiving are not performed in the wireless communication apparatus, depending upon the authentication result. In this manner, by the wireless communication apparatus having the SIM card and the controller, operation can be done based on the authentication result.

Tenth Embodiment

The wireless communication apparatus of the tenth embodiment, in addition to the elements of any one of the wireless communication apparatuses of the above-described embodiments, has a video compressor/expander. The video compressor/expander is connected to a bus. In this manner, by having a video compressor/expander, the wireless communication apparatus is able to transmit compressed video images and expand received compressed video images.

Eleventh Embodiment

The wireless communication apparatus in the eleventh embodiment, in addition to the elements of any one of the wireless communication apparatuses according to the above-described embodiments, has an LED unit and a controller. The controller acquires whether or not each of the elements is operating and the amount of data transmitted or received and the like. The controller, based on the operation states of the elements or the amount of data being processed, causes the LED of the LED unit to light or to flash. By lighting or flashing the LED depending upon the operation state of the wireless communication apparatus, the wireless communication apparatus is able to notify the user of the operation state of the wireless communication apparatus.

Twelfth Embodiment

The wireless communication apparatus of the twelfth embodiment, in addition to the elements of any one of the wireless communication apparatuses according to the above-described embodiments, has a vibrator and a controller. The controller acquires whether or not each of the elements is operating and the amount of data transmitted or received and the like. The controller operates the vibrator, based on the operation states of the elements or the amount of data being processed. For example, when the controller operates the vibrator, it controls the size and the interval of the vibrations generated by the vibrator. By operating the vibrator, the wireless communication apparatus is able to notify the user of the operation state of the wireless communication apparatus.

Thirteenth Embodiment

The wireless communication apparatus in the thirteenth embodiment has the elements regarding transmission and does not have the elements regarding receiving of the wireless communication apparatus of any one of the first, second, and third embodiments. The wireless communication apparatus in the thirteenth embodiment mainly performs transmission of data.

Fourteenth Embodiment

The wireless communication apparatus in the fourteenth embodiment has the elements regarding receiving and does not have the elements regarding transmission of the wireless communication apparatus of any one of the first, second, and third embodiments. The wireless communication apparatus in the fourteenth embodiment mainly performs receiving of data.

Fifteenth Embodiment

The wireless communication apparatus of the fifteenth embodiment has the elements regarding transmission and receiving of the wireless communication apparatus of any one of the first, second, and third embodiments, and performs data transmission and data receiving.

In the wireless communication systems in the above-described embodiments, the phase rotation to a segment into which the reference symbol is not inserted may always be 0 degree. If there are segments into which a reference symbol is not inserted, the phase rotation to all of the segments into which the reference symbol is not inserted may be 0 degree. The phase rotation to a part of the segments into which a reference symbol is not inserted may be 0 degree. For a segment with a phase rotation that is always 0 degree, the multiplier 107 in the transmitting-side wireless communication apparatus and the multiplier 207 in the receiving-side wireless communication apparatus become unnecessary, it is possible to simplify the configuration of the wireless communication apparatuses. For segments into which the reference symbol is not inserted and also having a phase rotation of 0 degree in the PTS, it is possible to reduce the influence of computing error in the wireless communication apparatuses and noise and interference in the communication path.

In the above-described embodiments, the description has been for a configuration in which the phase rotations is performed to a time-domain signal of a segment supplied from the IFFT processor 106 in the transmitting-side wireless communication apparatus. However, the computation that provides the phase rotation may be performed before the IFFT processor 106 generates the time-domain signal s104, in which case the a phase rotation may be performed to modulation symbols of each segment and reference symbol input to the IFFT processor 106.

In each of the above-described embodiments, the description has been for a configuration in which the wireless communication apparatus had an antenna. However, the wireless communication apparatus need not have an antenna, in which case the wireless communication apparatus performs transmission and reception via one or more antennas connected to the wireless communication apparatus itself.

In the above-described embodiments, the description has been for a configuration in which the IFFT processors 106-1 to 106-3 perform an inverse FFT and the FFT processor 203 performs an FFT. Instead of an inverse FFT (inverse fast Fourier transform), the IFFT processors 106-1 to 106-3 may convert the modulation symbols of each segment into time-domain signals by performing an inverse Fourier transform or inverse discrete Fourier transform. Also, the FFT processor 203, instead of an FFT (fast Fourier transform), may convert the signal obtained from the received signal into a frequency-domain signal by performing a Fourier transform or a discrete Fourier transform.

In the above-described embodiments, the description has been for a configuration in which the wireless communication apparatus has a phase rotation pattern storage. However, instead of having the phase rotation pattern storage, the wireless communication apparatus may read out phase rotation combination patterns C from an externally provided phase rotation pattern storage. The phase rotation pattern storage may be configured by either a volatile memory or a non-volatile memory. The phase rotation pattern storage may be configured by a non-volatile storage medium other than memory, such as an SSD (solid-state drive), or a hard disk.

The wireless communication apparatuses described in the above-described embodiments can be implemented by hardware that includes, for example, a general-purpose processor. The elements of the wireless communication apparatus are implemented by a processor included in the hardware of the wireless communication apparatus executing a program. This program may be installed beforehand into a non-volatile storage medium included in the hardware that can be read out by the processor. The hardware may acquire a program distributed via a network and install it into a non-volatile storage medium.

For example, the processor operates as the error correction encoder 101, the constellation mapper 102, the serial/parallel converter 103, the segment divider 124, the reference symbol inserters 105-1 to 105-2, the IFFT processors 106-1 to 106-3, the multipliers 107-1 to 107-3, the phase rotation pattern storage 131, the phase rotation pattern generator 128, the adder 109, the PAPR evaluator 110, the GI inserter 111, and the RF processor 112 of the wireless communication apparatus 100A. In this case, the hardware that includes the processor inputs data that includes a bit stream to be transmitted and generates an OFDM signal from the data. The hardware performs transmission signal processing to the OFDM signal into which a guard interval has been inserted, and sends the signal from a connected antenna.

An integrated circuit that includes a processor and a non-volatile storage medium may operate as the elements of the wireless communication apparatuses described in the above-described embodiments. For example, by the processor in the integrated circuit executing a program stored in the non-volatile storage medium, the processor operates as the elements of the wireless communication apparatus 100A. In this case, the integrated circuit inputs data that includes the bit stream to be transmitted and generates an OFDM signal from the data. The integrated circuit performs transmission signal processing to the OFDM signal into which a guard interval has been inserted. The integrated circuit transmits the signal obtained from the transmission signal processing from a connected antenna.

A computer simulation result regarding the PAPR reduction performance of wireless communication apparatuses according to the second and third embodiments will now be described. In the second and third embodiments, although the number of segments was made 3 in order to simplify the description, in the computer simulation the full number of subcarriers Nsc was taken to be 5516 and the number of segments Nseg was taken to be 13.

In general, PAPR performance is evaluated by a graph in which the horizontal axis represents the instantaneous amplitude of the OFDM signal and the vertical axis represents the CCDF (complementary cumulative distribution function). In a graph of this sort, the value on the horizontal axis corresponding to $10^{-6}$ on the vertical axis is treated as the PAPR.

Figure 13:
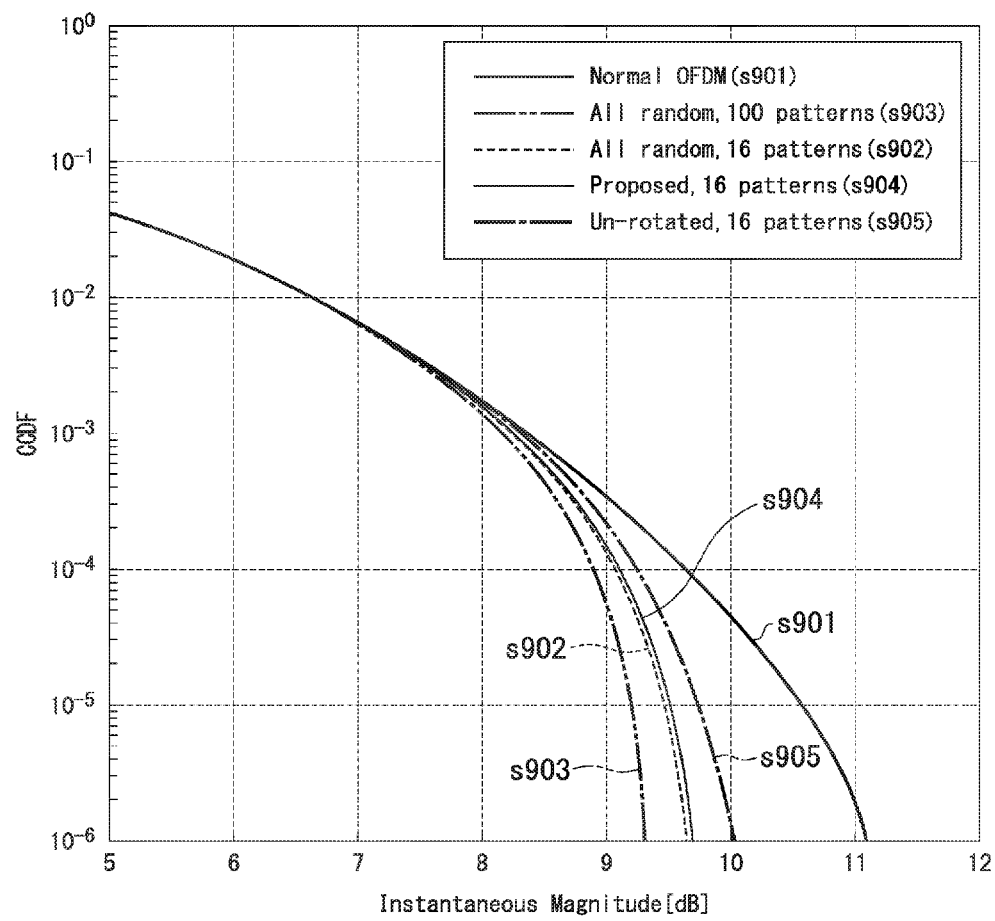
FIG. 13 is a CCDF graph illustrating the results of evaluation of a wireless communication apparatus in an embodiment.

FIG. 13 is a CCDF graph illustrating the evaluation results of a wireless communication apparatus of an embodiment. In this graph, curve s901 shows the OFDM signal characteristic when PAPR reduction is not done. The curve s902 shows the OFDM signal characteristics when reference symbols are inserted into all 13 segments, and also there are 16 phase rotation combination patterns. The curve s903 shows the OFDM signal characteristics when reference symbols are inserted into all segments and also there are 100 phase rotation combination patterns. Curve s904 shows the OFDM signal characteristics when reference symbols are inserted into 2 of the 13 segments and reference symbols are not inserted into the other 11 segments. The curve s905 shows the OFDM signal characteristics when reference symbols are inserted into 2 of the 13 segments, with reference symbols not inserted into the other 11 segments and also phase rotation not performed to the other 11 segments. In the characteristics shown by curve s903, although the PAPR reduction amount is the highest among these curves, because there are 100 types of phase rotation combination patterns, the computation burden increases greatly.

The characteristics shown by the curve s904 correspond to the characteristics of the wireless communication systems in the second and third embodiments. In the characteristics shown by the curve s904, there are 16 phase rotation combination patterns that can be applied. There is also a constraint that the phase rotations of the other 11 segments are detected from the phase rotations of the 2 segments into which the reference symbol is inserted. Regardless of this constraint, it can be seen that almost the same characteristics can be obtained as indicated by the curve s902, which has the same number of phase rotation combination patterns that can be applied.

That is, it can be seen that, even if there is a constraint on the phase rotation combination patterns, such as in the wireless communication systems in the second and third embodiments, as long as the number of phase rotation patterns is fixed, there is almost no deterioration in the PAPR reduction performance.

The characteristics shown by the curve s905 as well corresponds to the characteristics of the wireless communication systems in the second and third embodiments. As shown in FIG. 13, because no phase rotation is performed to 11 segments, the PAPR reduction performance is lower than the characteristics shown by the curve s904.

According to at least one of the above-described embodiments, by having a transmitting-side wireless communication apparatus in which segments are provided into which a reference symbol that notifies of the phase rotation in PTS is not inserted and a receiving-side wireless communication apparatus which detects the phase rotation of a segment into which a reference symbol is not inserted based on the phase rotation of a segment into which a reference symbol is inserted, it is possible to suppress the reduction in the data rate cause by reference symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a segment divider that divides a subcarrier group into subcarrier segments, the subcarrier group comprising a plurality of subcarriers;
a reference symbol inserter that inserts at least one reference symbol having a phase into at least one of the subcarrier segments;
a phase rotator that performs respective phase rotations to the subcarrier segments, based at least in part on a plurality of different combination patterns, each of the different combination patterns identifying a respective phase rotation to the subcarrier segments;
an adder that adds together signals corresponding to the subcarriers included in the subcarrier segments, to which the respective phase rotations have been performed by the phase rotator, to generate a transmission signal; and
a peak-to-average power ratio evaluator that calculates, for each of the plurality of different combination patterns, a peak-to-average power ratio of the transmission signals generated and that selects, from the transmission signals, a transmission signal having a smallest peak-to-average power ratio among the plurality of peak-to-average power ratios calculated.

2. The wireless communication apparatus according to claim 1, further comprising an RF processor that transmits the transmission signal selected by the peak-to-average power ratio evaluator.

3. The wireless communication apparatus according to claim 1, wherein the at least one reference symbol is a plurality of reference symbols, the reference symbol inserter inserts, into at least one of the subcarrier segments, the reference symbols having one or more phases.

4. The wireless communication apparatus according to claim 1, wherein the phase rotator performs a zero-degree phase rotation to the subcarrier segment free of any reference symbol.

5. The wireless communication apparatus according to claim 1, wherein the respective phase rotation is uniquely defined by the at least one reference symbol which is inserted into the subcarrier segment.

6. A wireless communication apparatus comprising:
a segment divider that divides a subcarrier group into subcarrier segments, the subcarrier group comprising a plurality of subcarriers;
a phase rotation pattern detector that, based at least in part on a phase of at least one reference symbol included in at least one of the subcarrier segments, identifies an amount of rotation given to the at least one of the subcarrier segments, the phase rotation pattern detector that, based at least in part on the amount of rotation identified, detects at least one combination pattern from a plurality of different combination patterns, each of the different combination patterns identifying a respective phase rotation to the subcarrier segments; and
a phase rotation canceller that, based at least in part on the at least one combination pattern detected, cancels a respective phase rotation given to the subcarrier segments.

7. A wireless communication apparatus comprising:
an antenna that transmits a transmission signal; and
an integrated circuit, comprising:
a segment divider that divides a subcarrier group into subcarrier segments, the subcarrier group comprising a plurality of subcarriers;
a reference symbol inserter that inserts at least one reference symbol having a phase into at least one of the subcarrier segments;
a phase rotator that performs respective phase rotations to the subcarrier segments, based at least in part on a plurality of different combination patterns, each of the different combination patterns identifying a respective phase rotation to the subcarrier segments;

an adder that adds together signals corresponding to the subcarriers included in the subcarrier segments, to which the respective phase rotations have been performed by the phase rotator, to generate a transmission signal; and a peak-to-average power ratio evaluator that calculates, for each of the plurality of different combination patterns, a peak-to-average power ratio of the transmission signals generated and that selects, from the transmission signals, a transmission signal having a smallest peak-to-average power ratio among the plurality of peak-to-average power ratios calculated.

* * * * *